United States Patent
Groenveld (10) Patent No.: US 7,676,487 B2
(45) Date of Patent: Mar. 9, 2010

(54) METHOD AND SYSTEM FOR FORMATTING AND INDEXING DATA

(75) Inventor: Damon N. Groenveld, Kinglake Central (AU)

(73) Assignee: Computer Associates Think, Inc., Islandia, NY (US)

(*) Notice: Subject to any disclaimer, the term of this patent is extended or adjusted under 35 U.S.C. 154(b) by 829 days.

(21) Appl. No.: 11/234,568

(22) Filed: Sep. 23, 2005

(65) Prior Publication Data

US 2006/0074971 A1 Apr. 6, 2006

Related U.S. Application Data (60) Provisional application No. 60/613,952, filed on Sep. 28, 2004.

(51) Int. Cl.
*G06F 7/00* (2006.01)

(52) U.S. Cl. .................................... 707/102
(58) Field of Classification Search ............ 707/2–5, 707/7, 100–102; 713/168
See application file for complete search history.

(56) References Cited

U.S. PATENT DOCUMENTS

| | | | | |
|---|---|---|---|---|
| 5,394,143 | A | 2/1995 | Murray et al. | 341/63 |
| 6,502,064 | B1 | 12/2002 | Miyahira et al. | 704/7 |
| 6,714,934 | B1* | 3/2004 | Fordham | 707/100 |
| 7,236,972 | B2* | 6/2007 | Lewak et al. | 707/4 |
| 2002/0020225 | A1* | 2/2002 | Sakai et al. | 73/861.22 |
| 2003/0163691 | A1* | 8/2003 | Johnson | 713/168 |

OTHER PUBLICATIONS

John Ryan, Brian Coghlan, "Grid TimesTamps: the Leap Second Problem", May 16, 2002.*
"Using Unicode with MIME", D. Goldsmith, Jul. 1994.*
"Number systems, Base Conversions, and Computer data Representation" (knowleage NPL).*
"lecture $ Notes : bits and bytes", Sep. 28, 2004.*
"Multipurpose Internet Mail Extensions (MIME)", N. Freed, Nov. 1996.*
"The U.S. American standards Committee for Information Interchange code", Feb. 24, 2003.*
"Base64" Wikipeida.*
"java Tip 117 : Transfer Binary data in an XML document". Odysseas Pentakolos, Sep. 28, 2001.*
Josefsson, "The Base 16, Base32, and Base64 Data Encodings," IETF Standard, Internet Engineering Task Force, IETF, pp. 1-13, Jul. 2003.
The Patent Office Search Report from International Application No. PCT/US2005/034572, 12 pages, Jan. 23, 2006.

* cited by examiner

*Primary Examiner*—Hung T Vy
(74) *Attorney, Agent, or Firm*—Baker Botts L.L.P.

(57) ABSTRACT

According to one embodiment, a method for formatting and indexing data includes selecting an input data string associated with a data entry. The input data string is of a first format associated with a first numeral system. The input data string is converted to a second format to create an output data string, which is associated with a second numeral system that is a higher-based numeral system than the first numeral system. The output data string is used to create an index associated with the data entry.

31 Claims, 3 Drawing Sheets

| \multicolumn{8}{c}{ASCII VALUES OF MODIFIED Base64 NUMERALS} |
| CHARACTER | ASCII VALUE | CHARACTER | ASCII VALUE | CHARACTER | ASCII VALUE | CHARACTER | ASCII VALUE |
|---|---|---|---|---|---|---|---|
| + | 43 | E | 69 | U | 85 | k | 107 |
| / | 47 | F | 70 | V | 86 | l | 108 |
| 0 | 48 | G | 71 | W | 87 | m | 109 |
| 1 | 49 | H | 72 | X | 88 | n | 110 |
| 2 | 50 | I | 73 | Y | 89 | o | 111 |
| 3 | 51 | J | 74 | Z | 90 | p | 112 |
| 4 | 52 | K | 75 | a | 97 | q | 113 |
| 5 | 53 | L | 76 | b | 98 | r | 114 |
| 6 | 54 | M | 77 | c | 99 | s | 115 |
| 7 | 55 | N | 78 | d | 100 | t | 116 |
| 8 | 56 | O | 79 | e | 101 | u | 117 |
| 9 | 57 | P | 80 | f | 102 | v | 118 |
| A | 65 | Q | 81 | g | 103 | w | 119 |
| B | 66 | R | 82 | h | 104 | x | 120 |
| C | 67 | S | 83 | i | 105 | y | 121 |
| D | 68 | T | 84 | j | 106 | z | 122 |

*FIG. 7*

START
↓
700 — SELECT INPUT DATA
↓
702 — CONVERT DATA USING A HIGH-BASED NUMERAL SYSTEM
↓
704 — INDEX DATA AND/OR ADDITIONAL RELATED DATA USING HIGH-BASED NUMERAL
↓
706 — USE INDEX TO EXPEDITE SEARCH
↓
END

METHOD AND SYSTEM FOR FORMATTING AND INDEXING DATA

RELATED APPLICATION

This application claims priority under 35 U.S.C. §119 of provisional application Ser. No. 60/613,952 filed Sep. 28, 2004.

TECHNICAL FIELD OF THE INVENTION

The present disclosure relates to data management and, more specifically, to a method and system for formatting and indexing data.

BACKGROUND OF THE INVENTION

A database is a collection of stored information. While databases need not necessarily be computerized, computerized databases allow for the storing, organizing, and efficient searching of very large collections of information. A database management system (DBMS) is a computer application that is designed to facilitate the accessing of a computerized database by, for example, performing functions that allow information to be added to and retrieved from a computerized database.

A directory service is a form of DBMS that allows for quick access to information from a database. Directory services are often optimized for simultaneous information retrieval by a large number of users. Because directory services are optimized for quick information retrieval rather than for allowing users to add, remove and modify database information, directory services are an excellent way for organizations to make database information available to large groups of users, many of whom may wish to access the database at the same time. Directory services may also utilize one or more standards and/or protocols such as, for example, X.500 directory standards, Lightweight Directory Access Protocol (LDAP), directory service markup language (DSML), or a combination of these or other standards and/or protocols.

Because of the immense size of modern databases and the large numbers of users who may wish to access a database simultaneously, database and directory service efficiency is of a primary concern. For example, users executing a query to find particular information demand speedy results. One method for increasing DBMS performance requires upgrading computer hardware to include additional and/or faster components such as CPUs, disk drives, and memory. Software may also be used to provide additional directory server processes. Complex design configurations related to routing, security, and/or administrative controls in directory services may also increase DBMS performance. The described solutions, however, often involve high costs in terms of hardware, software, maintenance, and operations.

SUMMARY OF THE INVENTION

In accordance with the present invention, techniques for formatting and indexing data are provided. According to particular embodiments, these techniques enable indexing based on simplified expressions of large values.

According to a particular embodiment, a method for formatting and indexing data includes selecting an input data string associated with a data entry. The input data string is of a first format associated with a first numeral system. The input data string is converted to a second format to create an output data string, which is associated with a second numeral system that is a higher-based numeral system than the first numeral system. The output data string is used to create an index associated with the data entry.

According to another embodiment, a method for formatting and indexing data includes selecting an input data string associated with a data entry. The input data string is of a first format. The input data string is converted to a second format to create an output data string which includes fewer characters than the input data string. The output data string is the representational equivalent of the input data string. An index associated with the data entry is created using the output data string.

Embodiments of the invention provide various technical advantages. One advantage may be that high-based numeral systems may be used to convert large values, represented by data strings, into indexable, simplified values. Accordingly, an advantage may be that multi-fielded numeric, date, or other generally non-string based data may be represented and stored as a string. In particular embodiments, the data string may then be converted into an indexable output data string that includes fewer characters than the original value. Such a result may be obtained where the set of characters used to represent the output data string is greater than the set of characters used to represent the input data string. Where the output data string includes fewer characters, however, query response times and database update response times may be decreased. For example, because indexes are often used to locate desired information, the more quickly the database management system is able to sift through the index the more quickly the query may be completed. Accordingly, reducing the number of characters in the index results in a faster query and database information may be more readily indexed in database management systems having limited indexing and search capabilities.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Lengthy, multi-fielded information may be stored in a database and accessed by a database management system (DBMS) during the performance of routine database management functions. The generally non-string based, multi-fielded information may be represented as a lengthy data string and used as an index for the selective retrieval of database entries associated with the information. A DBMS generally has indexing and searching limitations, however, that preclude the efficient retrieval of lengthy data strings. High-based numeral systems may be used, in particular embodiments, to converting lengthy data strings into simplified data strings. In general, a high-based numeral system applied to a lengthy input data string results in an output data string that requires fewer characters to represent the same information than the original input data string. This is true where the high-based numeral system includes a set of characters that is greater than the set of characters used to represent the input data string. Furthermore, where the resulting data strings include ordered characters that are associated with standardized and assigned values, the data information may be more readily used as an index during the performance of searches, queries, and database management operations.

Database information may in, particular embodiments, include a time stamp. A time stamp is a date and/or time attribute that may be used, for example, to indicate when a database entry is created and/or modified. Time stamps are typically non-string based information, but may be converted into string data for the purpose of performing queries on time stamp attributes. String data representative of time stamp information, however, typically includes long character strings that cannot be efficiently queried. Where the DBMS uses a high-based numeral system to convert string-represented time stamp into a simplified, indexable output data string that is represented with fewer characters, the DBMS may more efficiently use the time stamp data as a searchable index. In describing the preferred embodiments of the present disclosure illustrated in the drawings, specific terminology is employed for sake of clarity. However, the present disclosure is not intended to be limited to the specific terminology used and it is to be understood that each specific element includes all technical equivalents which operate in a similar manner.

Figure 1:
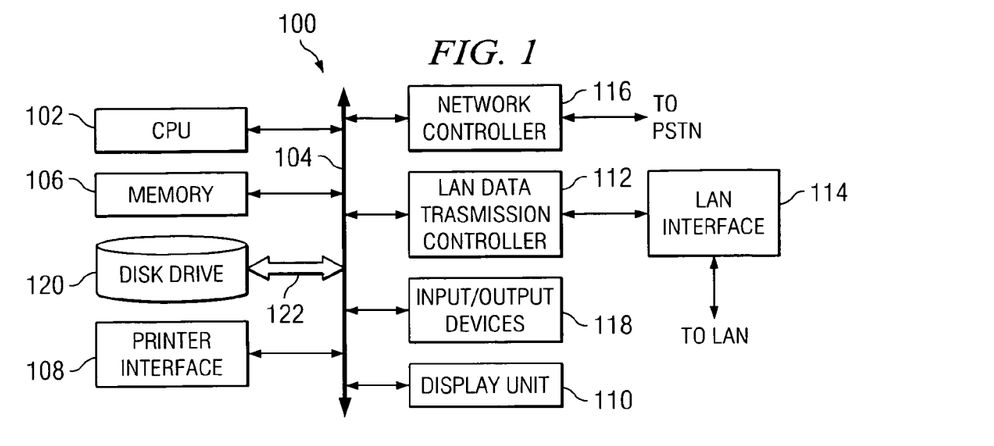
FIG. 1 illustrates an example computer system for formatting and indexing data in accordance with an embodiment of the present invention.

FIG. 1 illustrates a general purpose computer system 100 that may be used for the efficient formatting and indexing of data in accordance with an embodiment of the present invention. Specifically, computer system 100 may be used to execute applications and software to access information stored in a database management system (DBMS). Computer system 100 may be adapted to execute any of the well known MS-DOS, PC-DOS, OS2, UNIX, MAC-OS and Windows operating systems or other operating system.

In particular embodiments, computer system 100 comprises a central processing unit (CPU) 102 coupled to other system components via an internal bus 104. For example, in the illustrated embodiment, CPU 102 is coupled to a random access memory (RAM) 106, a printer interface 108, a display unit 110, a local area network (LAN) data transmission controller 112, a LAN interface 114, a network controller 116, and one or more input/output devices 118 such as, for example, a keyboard or a mouse. As shown, computer system 100 may be connected to a data storage device, for example, a disk drive 120 via a link 122. Disk drive 120 may include a variety of types of storage media such as, for example, floppy disk drives, hard disk drives, CD ROM drives, or magnetic tape drives. Disk drive 120 may also include a network disk housed in a server within computer system 100. Programs that are stored in RAM 106, disk drive 120, and/or a ROM (not illustrated) and may be executed by CPU 102.

The illustrated computer system 100 provides merely one example, however, of a computer system that may operate to simplify lengthy and complex data strings for the more efficient formatting and indexing of stored database information. It is recognized that computer system 100 may include fewer or more components as is appropriate for database management operations. As will be described in more detail below, computer system 100 may operate to more efficiently store, organize, and access data. Specifically, computer system 100 may operate to simplify lengthy and complex data strings by converting the data into a normalized and indexable data string using a high-based numeral system of ordered characters. In particular embodiment, these functions may be implemented in the form of a software application running on computer system 100, a mainframe, a personal computer (PC), a handheld computer, a server or other computer system. Where implemented using a software application, the software application may be stored on a recording media locally accessible by computer system 100 and accessible via a hard wired or wireless connection to a network, for example, a LAN, or the Internet.

Figure 2:
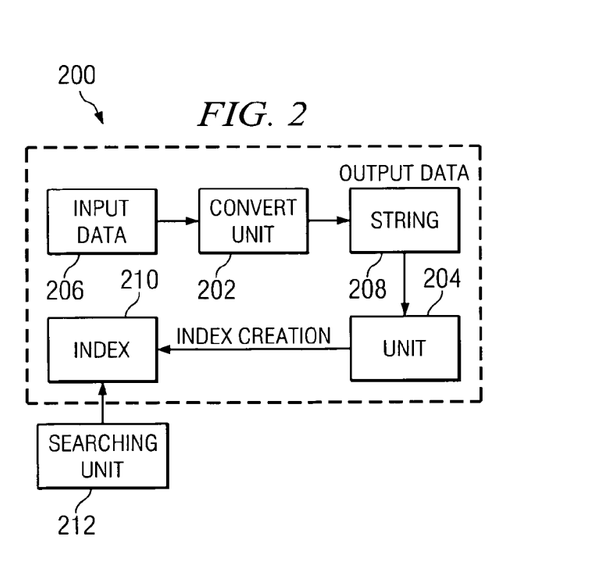
FIG. 2 illustrates a processor formatting and indexing data in accordance with an embodiment of the present invention.

FIG. 2 is a block diagram illustrating a processor 200 for formatting and indexing data in accordance with an embodiment of the present invention. Processor 200 may include a CPU such as that discussed above with regard to FIG. 1. In the illustrated embodiment, processor 200 includes a conversion unit 202 and an index creation unit 204. As will be described in more detail below, conversion unit 202 may use a high-based numeral system to convert input data 206 into a normalized and indexable data string, such as output data string 208. More specifically, conversion unit 202 may use the high-based numeral system to assign indicia from an ordered character set to the input data. The indexable output data string 208 may then be used by index creation unit 204 to generate an index 210 that may be used in the performance of searches, queries, and other database management operations.

In operation, conversion unit 202 receives input data 206. Input data 206 may include any data that is stored in memory 106, disk drive 120, or another storage device. In particular embodiments, for example, input data 206 may include a numerical string written in decimal form. For example, input data 206 may be retrieved from a column in a relational database server that is defined as a string-based column. Non-string based data may be stored in the formatted as a lengthy and complex numerical string that is written in numerical form. A particular example of non-string based data is discussed in more detail with regard to FIG. 3. The described and illustrated example, however, is merely one type of non-string based data that may be formatted and used as input data 206. It is generally recognized that the column of the relational database from which input data 206 may be retrieved may include many different types of data.

Returning to FIG. 2, conversion unit 202 uses an ordered character set associated with a high-based numeral system to generate output data string 208. In particular embodiments, the ordered character set includes any set of characters or other indicia that are arranged in ascending order. In other embodiments, the ordered character set may include any set of characters or other indicia that are arranged in descending order. Whether the ordered character set is arranged in ascending or descending order is immaterial so long as the arrangement of characters or other indicia within the ordered character set does not transition from ascending to descending, or vice versa, within the character set. As one example, the ordered character set may include a modified ASCII character set such as a modified character set having sixty-four distinct characters. An example application of a modified ASCII character set will be discussed in more detail with regard to FIGS. 5A-5B and 6.

Because the ordered character set associated with a higher-based numeral system is used to create output data string 208, output data string 208 may require fewer characters to represent the same value of input data 206 than was required in its initial format. As a result, output data string 206 may be more efficiently used as an index 210 than input data 206. In particular embodiments, index creation unit 204 receives output data string 208 and produces index 210. The produced index 210 includes an arrangement of characters that are representative of the original input data 206. Index 210 may subsequently be used by a searching unit 212 to efficiently search data associated with the index 210. For example, where values greater than an identified value are desired, searching unit 212 may search index 210 to locate one or more output data strings 208 that are greater than the identified value. Accordingly, searching unit 212, which may comprise a component internal to or external to processor 200, may perform search and query functions on index 210 to locate data greater than, less than, or equal to an identified value with improved efficiency.

Figure 3:
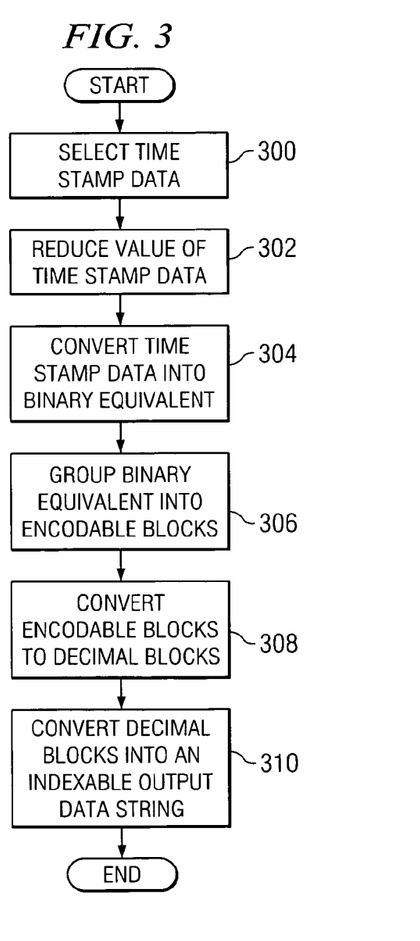
FIG. 3 illustrates an example method for formatting and indexing time stamp data using a high-based character set in accordance with an embodiment of the present invention.

An example application of the conversion of input data 206 to an indexable output data string 208 is better understood in the context of time stamp data, which is typically used, by a directory system, to mark data entries. In particular embodiments, a directory system may use time stamp data to indicate when a data entry was "created" or "last modified." Time stamp data for multiple data entries may then be used by a directory system in the selection of data entries for replication based on when the entries were created or last changed. FIG. 3 includes a flow chart illustrating an example method for formatting time stamp data in accordance with an embodiment of the present invention. The method begins at step 300 with the selection of time stamp data. In particular embodiments, the time stamp data is associated with a data entry stored in memory 106, disk drive 120, or another storage unit internal to or accessible to a processor 200.

Figures 4, 5A:
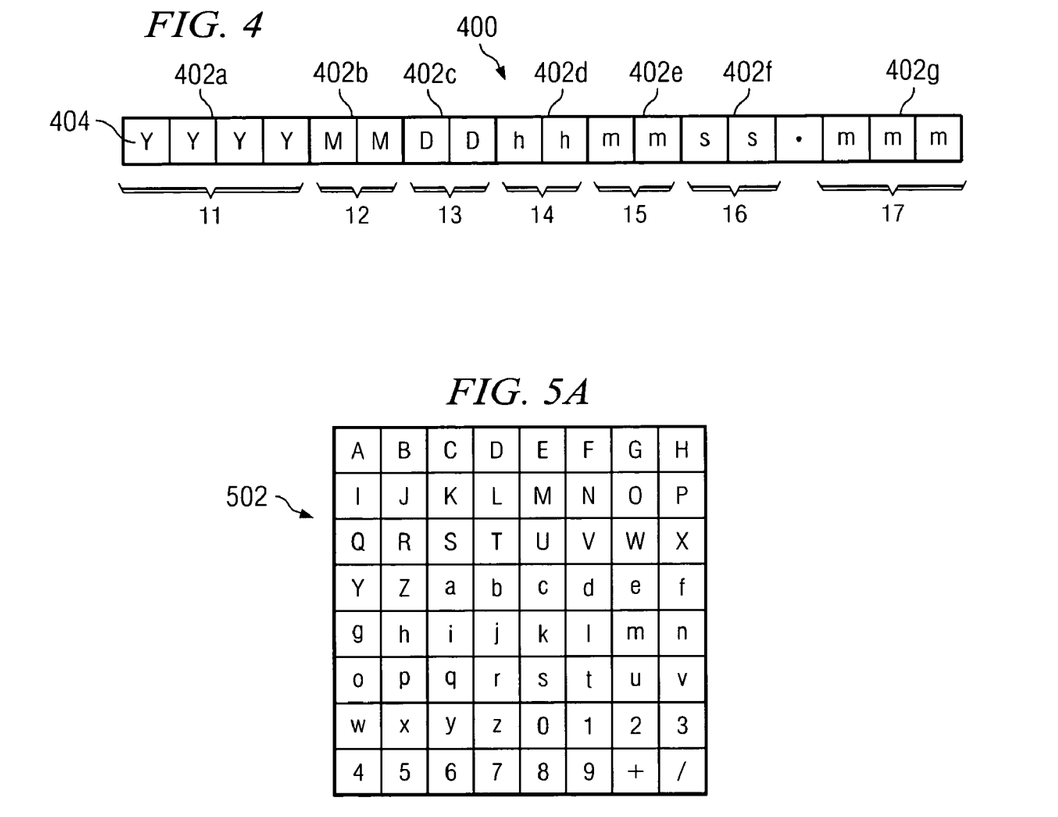
FIG. 4 illustrates an example format for storing time stamp data as a normalized string in accordance with an embodiment of the present invention.
FIGS. 5A-5B illustrate example unmodified and modified character set having sixty-four distinct characters in accordance with an embodiment of the present invention.

An example format that may be used to store time stamp data as a normalized string 400 is illustrated in FIG. 4. Specifically, normalized string 400 includes a number of fields 402 that store one or more characters 404 representative of a particular moment in time. In the illustrated embodiment, normalized string 400 includes seven fields 402a-g for storing data relating to the year, month, day, hour, minute, second, and millisecond, respectively. Typically, a normalized string 400 may include at least seventeen characters of time stamp data. As shown, normalized string 400 includes nineteen characters 404. It is generally recognized, however, that normalized string 400 may include any number of fields 402 and characters 404 that is appropriate for identifying a moment in the time associated with the time stamp data.

As an example, a data entry in memory 106 may be created on Jul. 21, 2004 at 11:10 a.m. and 56.123 seconds. As a result, the fields 402 of FIG. 4 may be populated with a normalized string 400 of "20040721111056.123." The time stamp data may then be used during periodic back-ups of the system to determine whether a save operation should be performed on the data entry. Specifically, system 100 may use the time stamp data to determine if the data entry was created or modified since the last back-up of the system. Performing a search for such a large data string, however, is generally inefficient and results in degraded system performance. Specifically, a DBMS performing a search indexed on a nineteen-character data string such as "20040721111056.123" may result in slowed search functions, may require additional system resources, and may be more expensive to maintain. As a result, many conventional systems may index time stamp data using only the first eight characters. For example, the time stamp data in the above described example may be indexed as "20040721" such that only the date Jul. 21, 2004, is represented by the indexed data.

Because the index is shortened by merely removing characters, the index may be said to be a truncated index. Search of such a truncated index, however, may render over-inclusive search results. Since a greater number of candidate data entries may be identified in response to the eight-character index search. For example, as described above, system 100 may search for and save all data entries that were created or modified since the last back-up operation was performed. If system 100 is limited to an index based only on the first eight characters of normalized string 400, however, a search for data entries to be backed-up would include data entries that were saved during a prior back-up operation on the same day even though such data entries were not modified since that back-up operation. In such a scenario, the data entries may then be further evaluated before their relevance to the desired search is confirmed.

By reducing the number of characters required to represent the time stamp data in its entirety, system 100 may perform more efficient index searches on the time stamp data. Accordingly, returning to FIG. 3, it may be desirable to reduce the decimal value of the time stamp data. In particular embodiments, such a conversion may include converting the time stamp data into a standard "C" format. The standard "C" format is a time formatting system utilized by the ANSI "C" programming language. In general, standard "C" programming requires that a time stamp be represented as the number of seconds since midnight Jan. 1, 1970. To convert the time stamp data into the standard "C" programming language time format, the number of seconds between the time stamp data and midnight Jan. 1, 1970 is calculated. For making this calculation a number of functions may be used, such as for example, the functions included within the "C" standard time library (time.h). Thus, continuing with the above described example, time stamp data that is represented by a multi-field normalized string 400 of "20040721111056.123" may be reduced to the decimal form of "1090408256.123," or which represents the number of seconds having passed since Jan. 1, 1970, or Jul. 21, 2004 at 11:10 a.m. and 56.123 seconds.

An additional benefit of converting the time stamp data from the normalized string 400 format to a standard "C" equivalent includes the conversion of multi-field time stamp data to a decimal string comprised of a single field. For example, where normalized string 400 includes multiple fields 402 (month, day, year, hours, minutes, seconds, milliseconds, etc.), the normalized string 400 may be converted into a single decimal number using the standard "C" programming language. Other conversions may be additionally or alternatively used, however, to create the single field time stamp. For example the years, months, days, hours and minutes may be converted into seconds and added together to create the time stamp in seconds. Alternatively, a format similar to the standard "C" programming language time format may be used to simplify the time stamp data by measuring the time stamp data relative to any date including a date that is other than Jan. 1, 1970.

For further simplification of the time stamp data, the time stamp data may be converted into a binary equivalent at step 304. The conversion of a decimal number into its binary equivalent generally requires that the time stamp be converted from a first numeral system (in the above example a numeral system having ten possible digits (base 10)) to the computer-recognized numeral system having two possible digits (base 2). Specifically, and by way of example only, the time stamp data represented by the "C" programming time format of "1090408256.123" may be converted into the following binary string:

01000000111111100100111101000000.0000000001111011

Although the resulting binary number includes a decimal point, the decimal point may be disregarded in future steps since time stamp data formatted into the standard "C" format includes the same number of digits after the decimal point as other similarly formatted time stamp data.

The binary string may then be grouped into a sequence of encodable blocks or other portions at step 306. In particular embodiments, an encodable block may include six binary characters (bits). For example, the above binary string, which represents a normalized string 400 of "20040721111056.123" may be grouped in the following eight encodable blocks having six bits each:

010000 001111 111001 001111 010000 000000 000001 111011

Although an encodable block may include six bits, it is recognized that each encodable block may include any number of bits suitable for effectively reducing the number of characters required to represent input data 206 after input data 206 is converted using an ordered character set associated with a high-based numeral system. Furthermore, the number of bits included in an encodable block may be related to the size of the character set used by the high-based numeral system. For example, encodable blocks of six bits each are best suited for use with a character set that includes sixty-four distinct characters. This is because, while in the binary form, each bit has two possible values. A six bit block, thus, has a total of $2^6$ possible values.

At step 308, each encodable block is converted into its decimal equivalent. In contrast to step 304, which is described above, the conversion of a binary string to a decimal equivalent generally requires that the binary string be converted from the computer-recognized numeral system having two possible digits (base 2) to a numeral system having ten possible digits (base 10). Thus, in the above described example, the grouped blocks of the binary string representing a normalized string 400 of "20040721111056.123" may be converted into the following eight decimal blocks:

16 15 57 15 16 0 1 59

For still further simplification of the time stamp data, each decimal block may then be related to a character of an ordered character set associated with a high-base numeral system at step 310. As described above, the ordered character set may include any set of assigned characters or other indicia that are arranged in ascending or descending order. Generally, any ordered character set that allows a simplified expression of large values may be used. For simplicities sake, the ordered character set may also have a commonality with the computer recognized binary numeral system. For example, the ordered character set may be associated with a high-based numeral system that, like the binary system, has a base that is a power of two. While any high-based numeral system greater than base 10 may be used, those numeral systems having a base that is a power of two ($2^4$=16, $2^5$=32, $2^6$=64, $2^{7=128}$, etc.) may more easily be handled by computers that natively utilize base 2 numerals. Accordingly, in various embodiments, the ordered character set may include sixteen distinct characters, thirty-two distinct characters, sixty-four distinct characters, 128 distinct characters, and so on. In particular embodiments, the selection of the ordered character set is based upon the lowest base character set that renders an indexable data string having eight or fewer characters such that the entire data string may be indexed for search purposes.

Figure 5B:
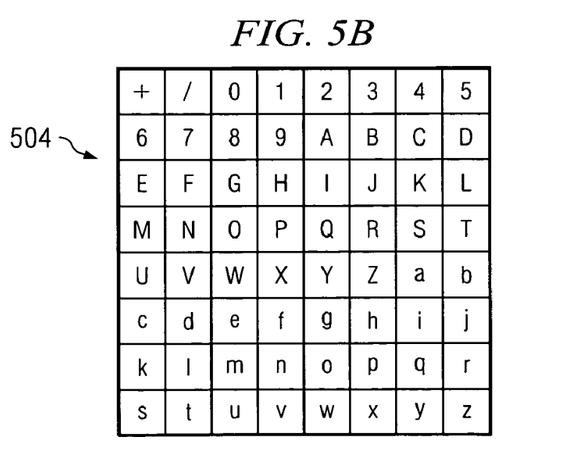

In a particular embodiment, the ordered character set may include a modified ASCII character set such as a modified character set. FIGS. 5A and 5B illustrate a standard ASCII character set 502 having sixty-four characters and a modified ASCII character set 504 having sixty-four characters, respectively. As shown in FIG. 5A, the standard ASCII character set begins with the "A" character and ends with characters "+" and "/". More particularly, the standard ASCII character set includes a sequential arrangement of sixty-four characters that includes the uppercase Alphabet, the lower case Alphabet, characters corresponding with numerals 0-9, the "+" character, and the "/" character (arranged in that order). Thus, the "A" character represents "0", the "B" character represents "1", and so on through the "/" character, which represents "64". By contrast, the modified ASCII character set 504 illustrated in FIG. 5B begins with the "+" and "/" characters and ends with the "z" character. More particularly, the modified ASCII character set 504 includes a sequential arrangement of characters that includes the "+" character, the "/" character, characters corresponding with numerals 0-9, the uppercase Alphabet, and the lower case Alphabet (in that order). Thus, the "+" character represents "0", the "/" character represents "1", the "1" character represents "3", and so on through the "z" character, which represents "64".

Figure 6:
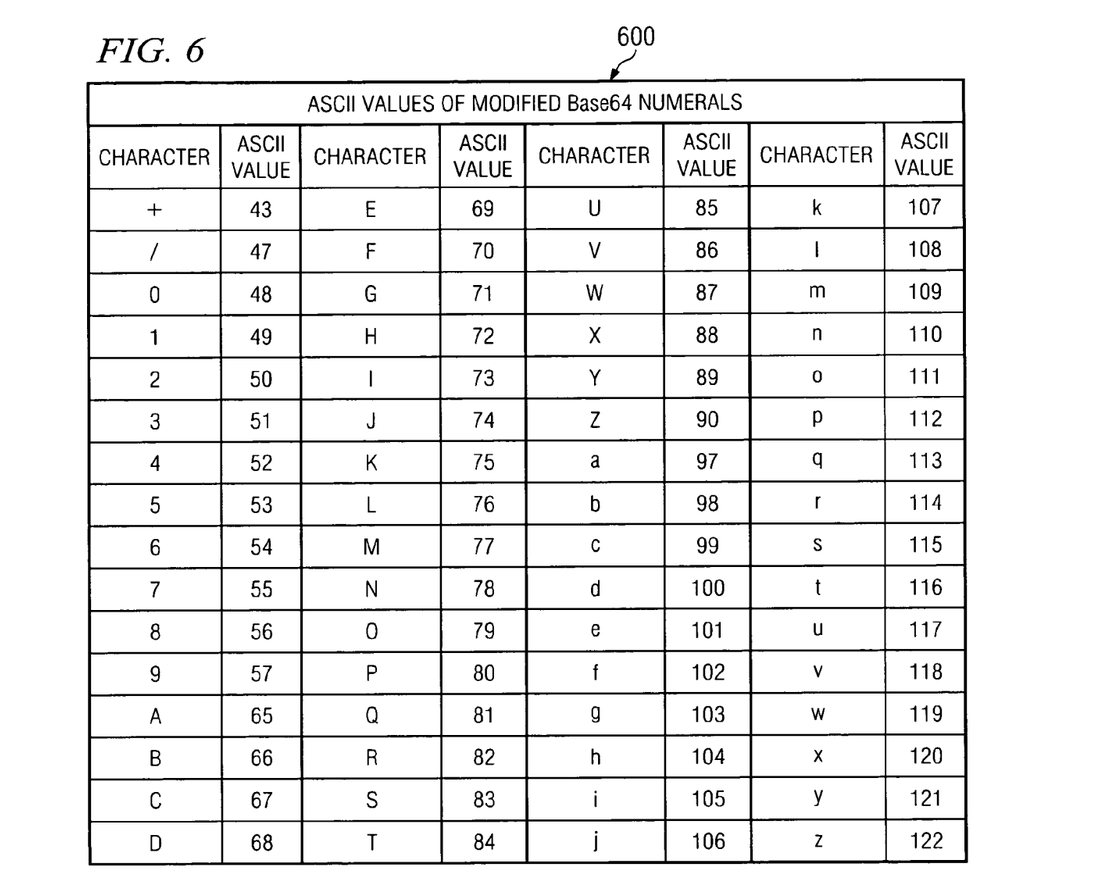
FIG. 6 illustrates the assignment of ASCII values to a character set having sixty-four distinct characters in accordance with various embodiments of the present invention.

The particular selection and arrangement of the characters in a modified character set 504 is better understood when the standardized ASCII assigned values of each character are considered. FIG. 6 includes a table 600 summarizing the standardized ASCII values assigned to a character set having sixty-four distinct characters. ASCII values are a list of values that are assigned to a set of commonly, used computer characters. These characters may be either printable characters or control characters. For example the printable character "A" has an ASCII value of 65 while the "end of text" control character has an ASCII value of 3. Printable characters are those characters that have a graphic representation while non-printable characters, for example, control characters such as the backspace, bell, escape, etc., lack a graphical representation. Embodiments of the present disclosure may utilize a modified numeral system that uses printable characters so that the resulting modified representations of numbers can be more easily displayed to and understood by users.

As described above, it is desirable that the ordered character set used to convert the time stamp data to an indexable output data is arranged in ascending or descending order. As can be seen from table 600, the standardized ASCII values assigned to the "+" and "/" characters are "43" and "47", respectively. The standardized ASCII values assigned to the "0-9" characters are "49-57", respectively. The standardized ASCII values assigned to the uppercase "A-Z" characters are "65-90", respectively. Finally, the standardized ASCII values assigned to the lowercase "a-z" characters are "97-122", respectively. Accordingly, it can be seen that when the ASCII characters are arranged in the standard format of FIG. 5A, the arrangement of characters is neither entirely ascending or entirely descending and, thus, for purposes of this document, is not ordered.

In contrast, when the ASCII characters are arranged in the modified format of FIG. 5B, the arrangement of characters is ordered such that when the sequence of characters is considered, each character is followed by a character having an assigned ASCII value that is greater the assigned ASCII value associated with the previous character. Accordingly, the modified numeral system illustrated in FIG. 5B can be said to have ascending ASCII values because a lower number is represented by characters with a lower ASCII value. As a result, when two data strings representing two decimal numbers in the modified numeral system are compared, the higher decimal number is represented by a higher string ASCII value. Alternatively it would be possible for higher numbers to be represented with lower ASCII values. In such a case, comparing two strings representing two different numbers in the modified numeral system, the higher number will be represented by the lower string ASCII value.

Returning to FIG. 3, when the modified numeral system of FIG. 5B is applied to the example began above (that originally includes a time stamp of "20040721111056.123") at step 310, the decimal blocks represented by "16 15 57 15 16 0 1 59" may be converted to the following ASCII characters:
EDtDE+/v Thus, the output data string, as written in modified or "ordered" ASCII characters, that may be used as an index is "EDtDE=/v". By converting the time stamp data using a higher base numeral system, the accuracy of the time stamp data is maintained even as the number of characters necessary for representing the time stamp data, in its entirety, is reduced.

The indexable output data string may then be used during the performance of search, query, or other database management functions to identify data that is equal to, greater than, or less than an identified value. For example, "EDtDE=/v" may be compared to other output data strings to determine their relationship to one another. In the context of time stamp data, where the output data strings are the same, it may be determined that each output data string represents the same date and time. Similarly, later dates may correspond to output data strings with higher string values, and earlier dates may correspond to output data strings with lower string values. As a result, it may be easily determined, when comparing output data strings, which output data string represents an earlier or later date, respectively.

Indexable output data strings formatted in the manner described above may also improve the results of sort operations performed by the DBMS. For example, consider the following sequence of data strings: 1, 4, 13, 20. When these data strings are sorted by a DBMS to be placed in increasing order, the result of the sort is: 1, 13, 20, 4. This is akin to sorting "a", "b", "c", and "ab" into the following increasing order sequence: a, ab, b, c. Using the above described format, however, the numeric sequences may be sorted into the correct order even though they are stored in an encoded string format.

It is recognized that the ordered character set 504 of FIG. 5B is merely one example of a character set than may be used to generate an indexable output data string. Other modifications to the standard ASCII character set 502 of FIG. 5A may alternatively be used. As further examples, any of the following modified ASCII character sets may be used in a manner similar to that described above:

characters are ordered to ascend in value. As can be seen, it is not necessary that each numeral character have sequential ASCII values. It is enough that the ASCII values of the numeral characters ascend or descend. By converting the time stamp data to a higher-based format, however, the accuracy of the time stamp data is maintained even as the number of characters necessary to represent the time stamp data in its entirety is reduced.

Modifications, additions, or omissions may be made to the above-described method without departing from the scope of the invention. The method may include more, fewer, or other steps. Additionally, steps may be performed in any suitable order without departing from the scope of the invention. As one example modification, step 302 for reducing the value of the time stamp data may be omitted. Accordingly, in particular embodiments, the time stamp data may not be reduced to a lesser decimal value using standard "C" programming format. In such a scenario, the method may proceed directly from step 300 to step 304 where the original decimal form of the time stamp data is converted into its binary equivalent. Although the binary equivalent of the unreduced time stamp data may include more characters than the binary equivalent of the "C" programming time format, step 302 may be omitted where the resulting binary form can be grouped into eight or fewer encodable blocks and each block may be related to a single character using the ordered high-based character set. As described above, such a configuration is desirable since most DBMSs limit search indexes to a maximum of eight characters.

Additionally, although an ordered ASCII character set of sixty-four characters may be considered optimal for generating a simplified expression of a large value, in some contexts, it is recognized that other ordered character sets may also operate to simplify the expression of a large value. Generally, a numeral system having sixty-four characters may have the advantage of allowing time stamp data to be converted into an eight character time stamp, as described above. As a result, a numeral system having sixty-four distinct characters may generate a time stamp that is more easily compatible with a DBMS that utilizes the eight-character truncation timestamp described above. Other ordered character sets of bases other than 64 may also render simplified expressions of eight or fewer characters. For example, an ordered set of sixteen or thirty-two characters may be used in the same manner as described above. The output data strings generated using character sets having sixteen or thirty-two characters, however, will include more characters than an output data string generated using a character set having sixty-four distinct characters. Thus, the greater the base of the notation used, the fewer the number of characters necessary for representing the original time stamp data in its entirety. As a result, lower-based character sets may be more appropriate for simplifying expressions of lower values than a character set having sixty-four distinct characters.

```
! " # $ % & ' ( ) * + , - . / 0 1 2 3 4 5 6 7 8 9 : ; < = > ? @ A B C D E F G H I J K L M N O P Q R S T U V W X Y Z [ \ ] ^ _ `
? @ A B C D E F G H I J K L M N O P Q R S T U V W X Y Z [ \ ] ^ _ ` a b c d e f g h i j k l m n o p q r s t u v w x y z { | } ~
" $ ' ( * + - . 0 1 3 4 6 7 9 : < = > ? @ B C E F H I K L N O Q R T U W X Z [ ] ^ ` a b c e f h i k l n o q r s t u v w x z | } ~
```

In each instance, the arrangement of characters is ordered such that each sequential character is followed by a character having an assigned ASCII value that is greater the assigned ASCII value associated with the previous character. Thus, the Additionally, although an ASCII character set having 128 distinct characters will generate an output data string having fewer characters than an equivalent data string generated using the ASCII character set having sixty-four distinct characters, the output data string generated using the former character set may include non-printable characters that are not displaying to or readable by a human. Accordingly, character set of 128 distinct characters may not be ideal in some embodiments. Similarly ASCII character sets having a base lower than base 10 may also be less than ideal since such character sets will generally not operate to reduce the number of characters required to represent the same value written in base 10. Furthermore, although an ASCII character set that includes a base that is not a power of two may also be used, such a character set will require a considerable amount of overhead to manage the bit shift required.

While ASCII characters may be used by embodiments of the present disclosure, the present disclosure may alternatively utilize other ordered character sets such as, for example, Unicode. This may be especially true for systems using non-Roman characters such as Cyrillic, Devanagari, and Hebrew, as such characters may have no ASCII value. Use of an alternative ordered character set such as Unicode may be especially useful for systems utilizing very large based numeral systems such as a numeral system having 128 distinct characters. Here utilizing an alternative ordered character set such as Unicode may allow for time stamps where all 128 numeral characters are printable characters.

Figure 7:
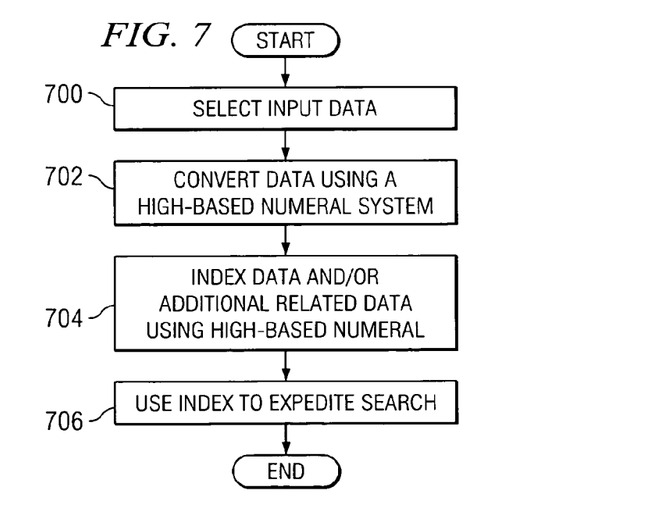
FIG. 7 illustrates an example method for formatting and indexing data in accordance with an embodiment of the present invention.

It is also recognized that the above described method is not limited to the formatting of time stamp data. FIG. 7 is a flow chart illustrating an example method for formatting and indexing data of any input format in accordance with an embodiment of the present invention. The method begins at step 700 when input data, such as input data 206, is selected. In particular embodiments, the input data is associated with a data entry stored in memory 102, disk drive 120, or another storage unit internal to or accessible to a DBMS. The input data may include a single field or multi-field data string that includes one or more characters 404 representative of database information associated with the data entry.

At step 702, the input data is converted into a simplified, indexable output data string, such as output data string 208, using a high-based numeral system. In particular embodiments, the high-based numeral system includes an ordered character set, such as the modified ASCII character set having sixty-four distinct characters illustrated in FIG. 5B. However, the ordered character set may include any set of assigned characters or other indicia that are arranged in ascending or descending order. In particular embodiments, the selection of the particular character set may be based upon the lowest base character set that renders an indexable data string having eight or fewer characters such that the entire data string may be indexed for search purposes.

At step 704, the simplified, indexable output data string is stored as an index associated with the input data string. In particular embodiments, additional related data may also be indexed using the output data string. The simplified, indexable output data string may then be used to expedite search, query, and other database management functions at step 706. For example, the output data string may be used to identify data that is equal to, greater than, or less than an identified value. For example, the output data string may be compared to other similarly formatted output data strings to determine their relationship to one another. Where the output data strings are the same, it may be determined that each output data string represents the same data. As a result, it may be easily determined, when comparing output data strings, which output data strings represents lesser, more, or equivalent values.

Although the present invention has been described in multiple embodiments, a myriad of changes and modifications may be suggested to one skilled in the art, and it is intended that the present invention encompass such changes and modifications as fall within the present appended claims.

What is claimed is:

1. A method for formatting and indexing data comprising:
selecting a time stamp data string associated with a data entry, the time stamp data string of a first format associated with a numeral system having exactly ten distinct characters and identifying when the data entry was created or modified;
converting the time stamp data swing into a binary equivalent comprising a plurality of bits;
grouping the plurality of bits into a plurality of blocks, each block comprising a plurality of bits;
converting each of the plurality of blocks into a decimal equivalent ranging from 0 to 63;
converting each decimal equivalent into a character associated with a numeral system having exactly sixty-four distinct characters, the numeral system having an ordered arrangement of characters comprising +, /, 0 ... 9, A ... Z, and a ... z such that a decimal equivalent of 0 is converted into a "+" and a decimal equivalent of 63 is converted into a "z";
connecting the one or more characters to create the output data string, the output data string comprising fewer characters than the time stamp data string, the output data string being the representational equivalent of the time stamp data string;
using the output data string to create an index associated with the data entry; and
identifying the index associated with the data entry in response to performing a database search.

2. A method for formatting and indexing data comprising:
selecting an input data string associated with a data entry, the input data string of a first format associated with a first numeral system;
converting the input data string into a second format associated with a second numeral system, the second numeral system comprising a lower based numeral system than the first numeral system;
converting the second format into a third format associated with a third numeral system to create an output data string, the third numeral system comprising a higher-based numeral system than the first numeral system,
wherein the third numeral system comprises an ASCII character set comprising +, /, 0 ... 9, A ... Z, and a ... z, and
wherein the conversion requires that a lowest value of the second numeral system is converted into a "+" character and a highest possible value of the second numeral system is converted into a "z"; and
using the output data string to create an index associated with the data entry.

3. The method of claim 2, further comprising:
performing a database search on a plurality of data entries; and
identifying the index associated with the data entry in response to performing a database search.

4. The method of claim 2, wherein selecting the input data string comprises selecting time stamp data associated with the data entry.

5. The method of claim 4, wherein the time stamp data identifies when the data entry was created or modified.

6. The method of claim 4, wherein the time stamp data comprises a multi-field, multi-character data string.

7. The method of claim 4, further comprising:
expressing the time stamp data as a standard C time format before converting the input data string to the second format.

8. The method of claim 2, wherein:
converting the input data string into the second format comprises converting the input data string into a binary equivalent comprising a plurality of bits; and
converting the second format into the third format comprises:
grouping the plurality of bits into a plurality of blocks, each block comprising a plurality of bits;
converting each of the plurality of blocks into a decimal equivalent;
converting each decimal equivalent into a character corresponding with the higher-based numeral system; and
connecting each character to create the output data string.

9. The method of claim 2, wherein the third numeral system that comprises the higher-based numeral system has a base greater than 10.

10. The method of claim 2, wherein the third numeral system that comprises the higher-based numeral system has exactly sixty-four distinct characters.

11. The method of claim 2, wherein the third numeral system that comprises the higher-based numeral system has exactly sixty-four distinct characters, the third numeral system comprising an ordered arrangement of characters based on assigned character values associated with the characters.

12. The method of claim 11, wherein the character values comprise ASCII character values.

13. The method of claim 2, wherein:
the input data string comprises more than eight or more characters; and
the output data string comprises eight or fewer characters, the output data string being the representational equivalent of the input data string.

14. A database management system for formatting and indexing data comprising:
a memory storing a plurality of data entries; and
a processor coupled to the memory and operable to:
select an input data string associated with a selected data entry, the input data string of a first format associated with a first numeral system;
convert the input data string into a second format associated with a second numeral system, the second numeral system comprising a lower based numeral system than the first numeral system;
convert the second format into a third format associated with a third numeral system to create an output data string, the third numeral system comprising a higher-based numeral system than the first numeral system, wherein the third numeral system comprises an ASCII character set comprising +, /, 0 . . . 9, A . . . Z, and a . . . z, and
wherein the conversion requires that a lowest value of the second numeral system is converted into a "+" character and a highest possible value of the second numeral system is converted into a "z"; and
use the output data string to create an index associated with the data entry.

15. The system of claim 14, wherein the processor is further operable to:
perform a database search on a plurality of data entries; and
identify the index associated with the data entry in response to performing a database search.

16. The system of claim 14, wherein the input data string comprises time stamp data associated with the selected data entry.

17. The system of claim 16, wherein the time stamp data identifies when the data entry was created or modified.

18. The system of claim 16, wherein the time stamp data comprises a multi-field, multi-character data string.

19. The system of claim 16, wherein the processor is further operable to:
express the time stamp data as a standard C time format before converting the input data string to the second format.

20. The system of claim 14, wherein:
the processor is operable to convert the input data string into the second format by converting the input data string into a binary equivalent comprising a plurality of bits; and
the processor is operable to convert the second format into the third format by:
grouping the plurality of bits into a plurality of blocks, each block comprising a plurality of bits;
converting each of the plurality of blocks into a decimal equivalent;
converting each decimal equivalent into a character corresponding with the higher-based numeral system; and
connecting each character to create the output data string.

21. The system of claim 14, wherein the third numeral system that comprises the higher-based numeral system has a base greater than 10.

22. The system of claim 14, wherein the third numeral system that comprises the higher-based numeral system has exactly sixty-four distinct characters.

23. The system of claim 14, wherein the third numeral system that comprises the higher-based numeral system has exactly sixty-four distinct characters, the third numeral system comprising an ordered arrangement of characters based on assigned character values associated with the characters.

24. The system of claim 23, wherein the character values comprise ASCII character values.

25. The system of claim 14, wherein:
the input data string comprises more than eight or more characters; and
the output data string comprises eight or fewer characters, the output data string being the representational equivalent of the input data string.

26. Logic for formatting and indexing data, the logic encoded in media and operable when executed to:
select an input data string associated with a data entry, the input data string of a first format associated with a first numeral system;
convert the input data string into a second format associated with a second numeral system, the second numeral system comprising a lower based numeral system than the first numeral system;
converting the second format into a third format associated with a third numeral system to create an output data string, the third numeral system comprising a higher-based numeral system than the first numeral system,
wherein the third numeral system comprises an ASCII character set comprising +, /, 0 . . . 9, A . . . Z, and a . . . z, and
wherein the conversion requires that a lowest value of the second numeral system is converted into a "+" character and a highest possible value of the second numeral system is converted into a "z"; and use the output data string to create an index associated with the data entry.

27. The logic of claim 26, further operable when executed to:
perform a database search on a plurality of data entries; and
identify the index associated with the data entry in response to performing a database search.

28. The logic of claim 26, wherein when selecting the input data string the logic is further operable to select time stamp data associated with the data entry.

29. The logic of claim 26, further operable to:
convert the input data string into the second format by converting the input data string into a binary equivalent comprising a plurality of bits; and
convert the second format into the third format by:
grouping the plurality of bits into a plurality of blocks, each block comprising a plurality of bits;
converting each of the plurality of blocks into a decimal equivalent;
converting each decimal equivalent into a character corresponding with the higher-based numeral system; and
connecting each character to create the output data string.

30. The logic of claim 26, wherein the third numeral system that comprises the higher-based numeral system has exactly sixty-four distinct characters, the third numeral system comprised of a modified arrangement of characters within a character set, the modified arrangement of characters having ordered character values.

31. A method for formatting and indexing data comprising:
selecting an input data string associated with a data entry, the input data string of a first format;
converting the time stamp data string into a second format, the second format comprising a binary equivalent, the binary equivalent comprising a plurality of bits;
grouping the plurality of bits into a plurality of blocks, each block comprising a plurality of bits;
converting each of the plurality of blocks into a decimal equivalent;
converting each decimal equivalent into an ASCII character associated with a third format to create an output data string, the output data string comprising fewer characters than the input data string, the third format comprising a numeral system having a modified ordered arrangement of characters based on ascending or descending character values, the output data string being the representational equivalent of the input data string,
wherein the modified arrangement of characters comprises a character set comprising +, /, 0 . . . 9, A . . . Z, and a . . . z, and
wherein the conversion requires that a lowest value of the second numeral system is converted into a "+" character and a highest possible value of the second numeral system is converted into a "z"; and
creating an index associated with the data entry using the output data string.

* * * * *